US008356149B2

United States Patent
Young et al.

(10) Patent No.: US 8,356,149 B2
(45) Date of Patent: Jan. 15, 2013

(54) MEMORY MIGRATION

(75) Inventors: Paul J. Young, Hudson, MA (US); Raun Boardman, Nashua, NH (US); Karen L. Noel, Pembroke, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 12/609,173

(22) Filed: Oct. 30, 2009

(65) Prior Publication Data

US 2011/0107044 A1 May 5, 2011

(51) Int. Cl.
*G06F 12/00* (2006.01)
*G06F 13/00* (2006.01)
*G06F 13/28* (2006.01)

(52) U.S. Cl. ....................................................... 711/162

(58) Field of Classification Search .................... 711/162
See application file for complete search history.

(56) References Cited

U.S. PATENT DOCUMENTS

| | | | | |
|---|---|---|---|---|
| 6,789,162 | B1 * | 9/2004 | Talagala et al. | 711/112 |
| 7,089,391 | B2 * | 8/2006 | Geiger et al. | 711/170 |
| 7,266,652 | B1 * | 9/2007 | Hotle et al. | 711/158 |
| 7,484,208 | B1 * | 1/2009 | Nelson | 718/1 |
| 2009/0037680 | A1 | 2/2009 | Colbert et al. | |
| 2009/0198925 | A1 | 8/2009 | Hosomi et al. | |

* cited by examiner

*Primary Examiner* — Yong Choe
*Assistant Examiner* — Craig Goldschmidt

(57) ABSTRACT

A source system comprises memory and a processor executing code to cause at least some of the memory to be migrated over a network to a target system. The processor causes the memory to be migrated by migrating some of the memory while a guest continues to write the memory, halts execution of the guest, and completes a remainder of the memory migration.

17 Claims, 7 Drawing Sheets

MEMORY MIGRATION

BACKGROUND

Situations exist in which memory from one computer is to be copied (migrated) to another computer. Depending on the amount of memory involved, the migration process may be substantially time consuming. Any application using such data, that is halted to allow the migration to occur, is inconvenienced (particularly to a user of such an application) to say the least, and may time-out if the migration takes too long.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
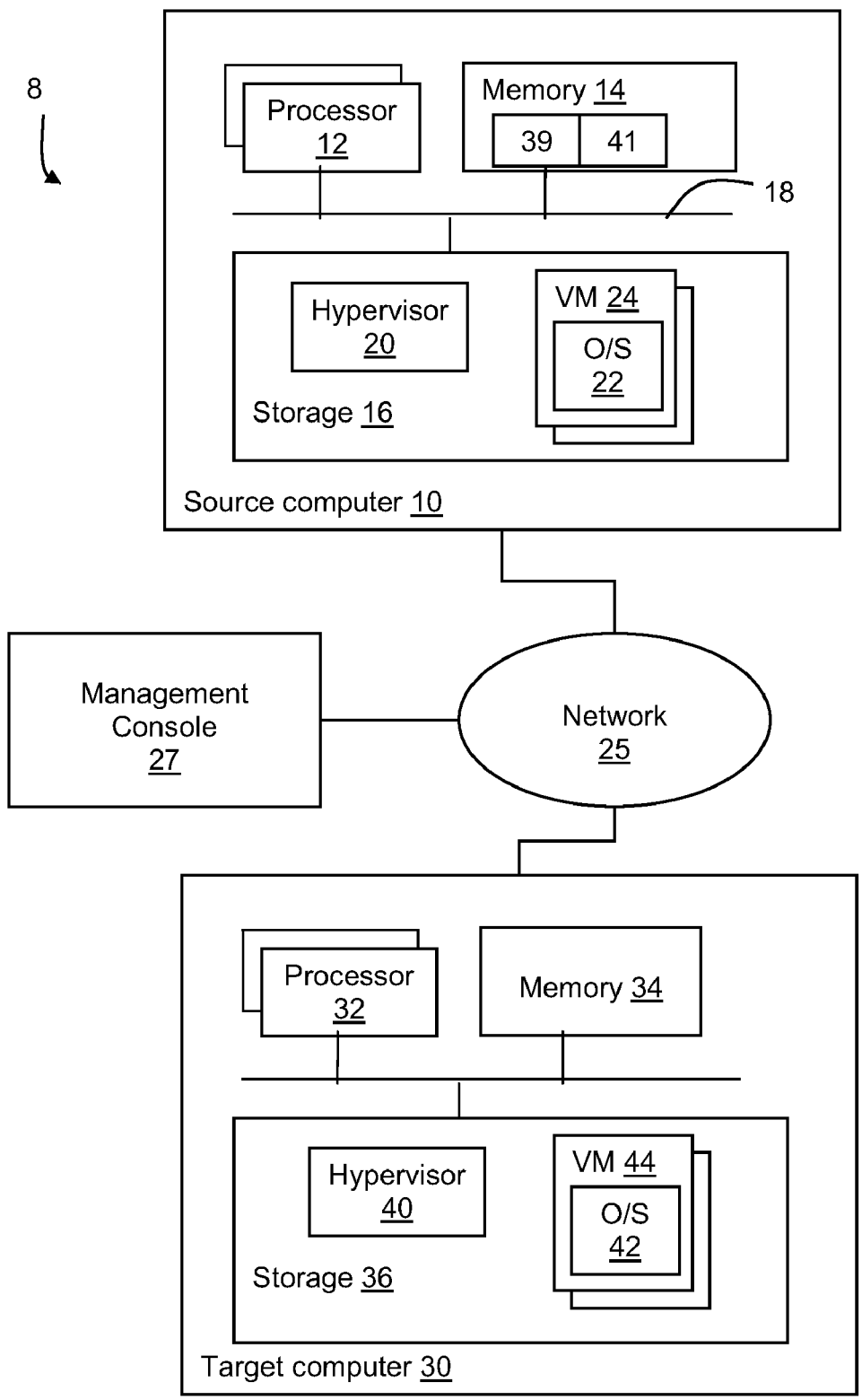
FIG. 1 shows a system in accordance with various embodiments.

FIG. 1 illustrates an embodiment of a system 8 that comprises a source computer 10 coupled to a target computer 30 via a network communication link 25. A management console 27 may also be included and coupled to the network communication link 25. The management console 27 may comprise a computer with an input device and an output device that permit a user to observe and control the behavior of the system 8. In at least some embodiments, the network communication link 25 comprises a local area network (LAN), wide area network (WAN), wireless network, wired network, combinations of LANs, WANs, wireless networks, and wired networks, etc. In some embodiments, the network communication link 25 comprises the Internet.

As explained herein, content of memory in the source computer 10 is migrated over the network communication link 25 from the source computer 10 to the target computer 30, hence the labels "source" and "target" for computers 10 and 30, respectively. Migrating memory means that the content of memory in one computer is copied to the memory in another computer. In the embodiment of FIG. 1, the content of memory in the source computer 10 is copied and thus replicated in the memory of the target computer 30. In accordance with various embodiments, the migration of memory from the source computer 10 to the target computer 30 occurs while one or more processes (guests) in the source computer 10 continue to write to the memory being migrated.

The source computer 10 of FIG. 1 comprises one more processors 12 coupled to memory 14 and storage 16 via a bus 18. Other embodiments may comprise the processors 12 coupled to memory 14 and storage 16 via architectures different than that shown in FIG. 1. In various embodiments, the memory 14 comprises random access memory (RAM). The storage 16 may comprise volatile storage (e.g., RAM), non-volatile storage (e.g., hard disk drive, compact disk read-only memory (CD ROM), a read-only memory (ROM), Flash storage, etc.), or combinations thereof. Either or both of memory 14 and storage 16 comprise computer-readable storage that may contain software that, when executed by the processor(s) 12 causes the processor(s) to perform one or more or all of the actions described herein as attributable to the source computer 10. In the embodiment of FIG. 1, such software is represented as hypervisor 20.

In FIG. 1, the target computer 30 comprises a similar architecture to that of the source computer 10. As shown, target computer 30 comprises one or more processors 32 coupled to memory 34, and storage 36 via a bus 38. Other embodiments may comprise the processors 32 coupled to memory 34 and storage 36 via architectures different than that shown in FIG. 1. In various embodiments, the memory 34 comprises random access memory (RAM). The storage 36 may comprise volatile storage (e.g., RAM), non-volatile storage (e.g., hard disk drive, compact disk read-only memory (CD ROM), a read-only memory (ROM), Flash storage, etc.), or combinations thereof. Either, or both collectively, of memory 34 and storage 36 comprise computer-readable storage that may contain software that, when executed by the processor(s) 32 causes the processor(s) to perform one or more or all of the actions described herein as attributable to the target computer 30. In the embodiment of FIG. 1, such software is represented as hypervisor 40.

As shown in the embodiment of FIG. 1, storage 16 of the source computer 10 comprises a hypervisor 20 and one or more virtual machines (VM's) 24. Each VM 24 may comprise an operating system 22. Similarly, storage 36 of the target computer 30 comprises a hypervisor 40 and one or more VM's 44, each VM 44 comprising an operating system 42. The hypervisors 20, 40, OS's 22, 42, and VM's 24, 44 comprise code that is executable by processor(s) 12. The functionality provided by the target computer's hypervisor 40, OS's 42, and VM's 44 is similar to that of the corresponding elements of the source computer 10. The hypervisor 20 of the source computer 10 allocates the various system resources for use by the various virtual machines. The hypervisor coordinates the use of various system resources (processor cycles, memory, etc.) to effectively make such resources appear to virtual machines (or guests) as an independently operating computer. An operating system 22 runs on a VM 24. With this software architecture, multiple virtual machines 24 can run concurrently, each with its own operating system 22. While running, a virtual machine 24 is allocated a portion of memory 14 for use in performing read and write transactions. Different virtual machines 24 are allocated different, generally non-overlapping, regions of memory 14 by the hypervisor 20.

When desired, a virtual machine 24 may be migrated from one computer to another computer. For example, a VM 24 running on source computer 10 may be migrated to target computer 30 to continue running on target computer 30. At least part of the migration process for the VM 24 includes migrating memory 14 from the source computer 10 on which the VM 24 currently is running to the target computer 30 on which the VM eventually is to continue running. The VM 24 on the source computer 10 can continue reading and writing the memory 14 while such memory 14 at least part of the time is being migrated.

Figure 2:
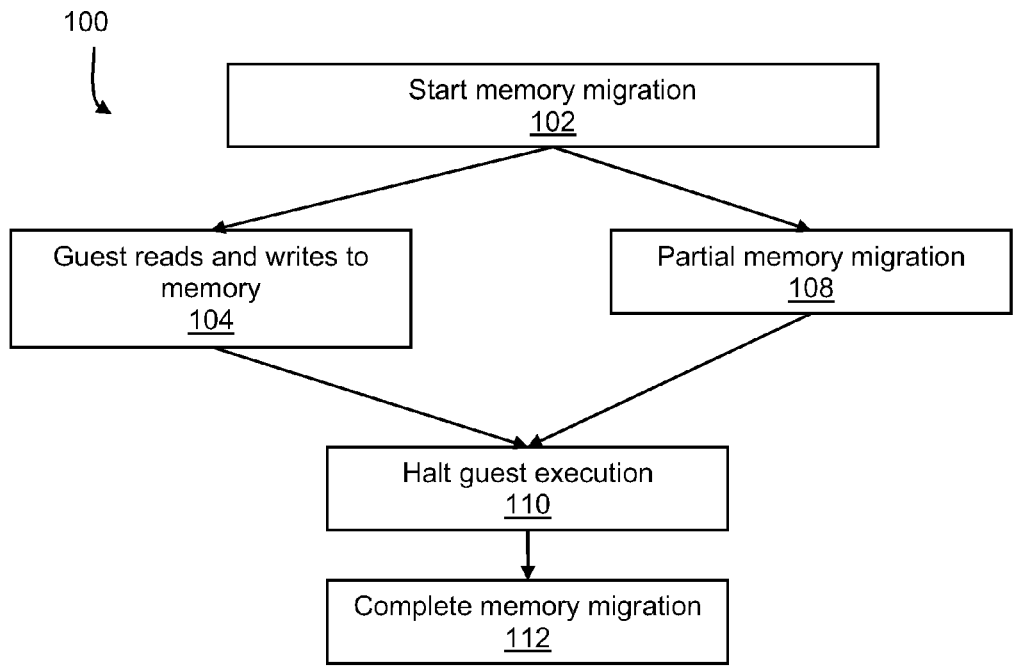
FIG. 2 shows a method in accordance with various embodiments.

FIG. 2 provides a method 100 in accordance with various embodiments. The method 100 of FIG. 2 is performed by the source computer's hypervisor 20 in various embodiments. At 102, the memory migration process starts. Initiation of memory migration may begin manually at the request of a user (e.g., network administrator) of the management console 27. When the memory migration process commences, a virtual machine (referred to herein as a "guest virtual machine" or simply "guest") is currently running and reading and writing its allocated memory. At 104, the guest virtual machine continues to read and/or write the memory being migrated. At the same time (i.e., in parallel with the guest writing and reading the memory), a partial memory migration is performed (108) by, for example, the hypervisor 20. In the partial memory migration some, but not all, of the memory being migrated is copied to the memory of the target computer 30. Because the guest VM continues to write the source memory, not all of the source memory can be migrated. Once the partial memory migration is complete, execution of the guest VM is halted at 110, and at 112 the memory migration completes.

Figure 3:
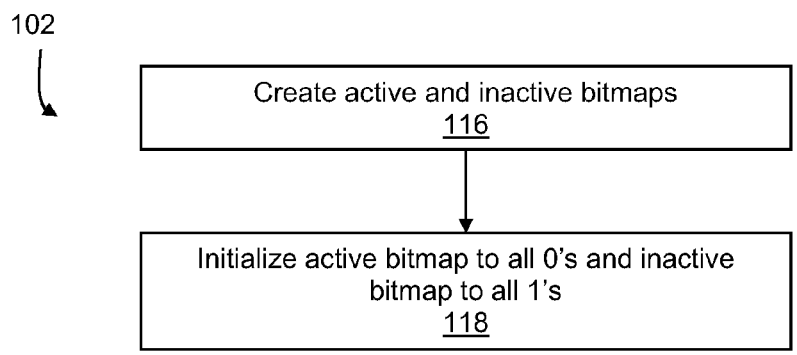
FIG. 3 shows a method of starting the migration process in accordance with various embodiments.

FIG. 3 illustrates an embodiment of the process of starting the memory migration (102). In the embodiment of FIG. 3, an "active" bitmap and an "inactive" bitmap are created (116) by the hypervisor 20. FIG. 1 shows an active bitmap 39 and an inactive bitmap 41 in memory 14. At 118, all bits in the active bitmap are initialized to a common logic state (e.g., all 0's). Similarly, all bits in the inactive bitmap are initialized to a common logic state which is different than the common logic state for the active bitmap. For example, the bits of the inactive bitmap are initialized to all 1's.

Figure 4:
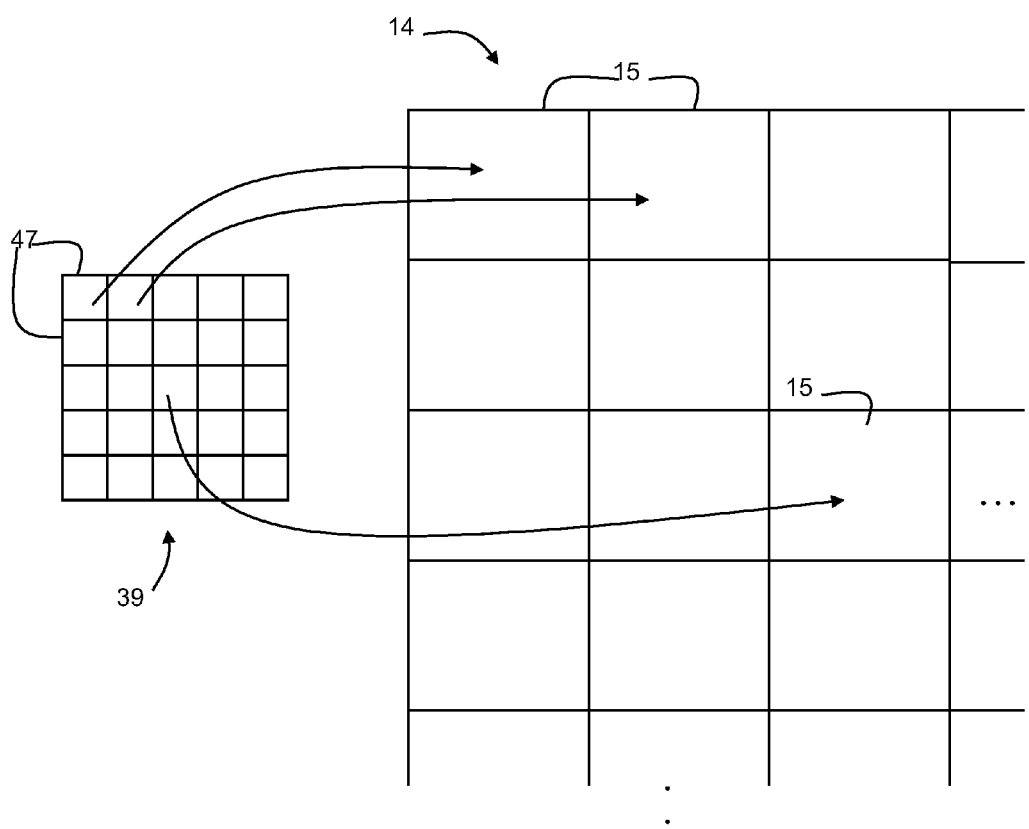
FIG. 4 illustrates a bitmap usable in accordance with various embodiments.

The active and inactive bitmaps 39, 41 are used during the memory migration process and enable the guest VM 24 to continue writing to the memory 14 while concurrently the memory is being migrated. In general, the guest VM 24 updates bits in the active bitmap 39 as it performs memory writes, and the hypervisor 20 reads bits from the inactive bitmap 41 to determine which portions of the memory are to be migrated. Each bit in each bitmap 39, 41 corresponds to a unit of memory. In some embodiments, a unit of memory comprises a page of memory. In other embodiments, a unit of memory comprises a group of pages of memory. FIG. 4 illustrates an active bitmap 39 comprising a plurality of bits 47 and how each bit 47 maps to an associated unit 15 of memory 14—each bit 47 maps to a different unit 15 of memory.

In accordance with various embodiments, a logic "1" in a bit of a bitmap signifies that the corresponding unit of memory has recently been written with data, and a "0" means a write has not recently occurred. In other embodiments, a logic "0" signifies a recent data write and a logic "1" means no write has occurred. For the embodiments discussed below, logic "0" means no recent write has occurred and logic "1" means a recent write has occurred.

Initializing the active bitmap 39 to all 0's permits the guest VM 24 to signify to the hypervisor 20, which performs the memory migration, which units of memory have been written while the hypervisor 20 is performing the partial memory migration. Accordingly, as the guest VM 24 writes a particular unit of memory, the guest VM 24 or hypervisor 20 changes the bit associated with the unit of memory from a 0 to a 1 in the active bitmap 39.

Initializing the inactive bitmap 41 to all 1's causes the hypervisor 20 to begin the partial memory migration process in 108 by attempting to copy all of the source memory 14 to the target memory 34. When the memory migration process begins, it is not known which units have valid data that need to be migrated and which units do not. Thus, it should be assumed that all of the memory should be migrated. Initializing the inactive bitmap 41 to all 1's imposes that requirement.

Figure 5:
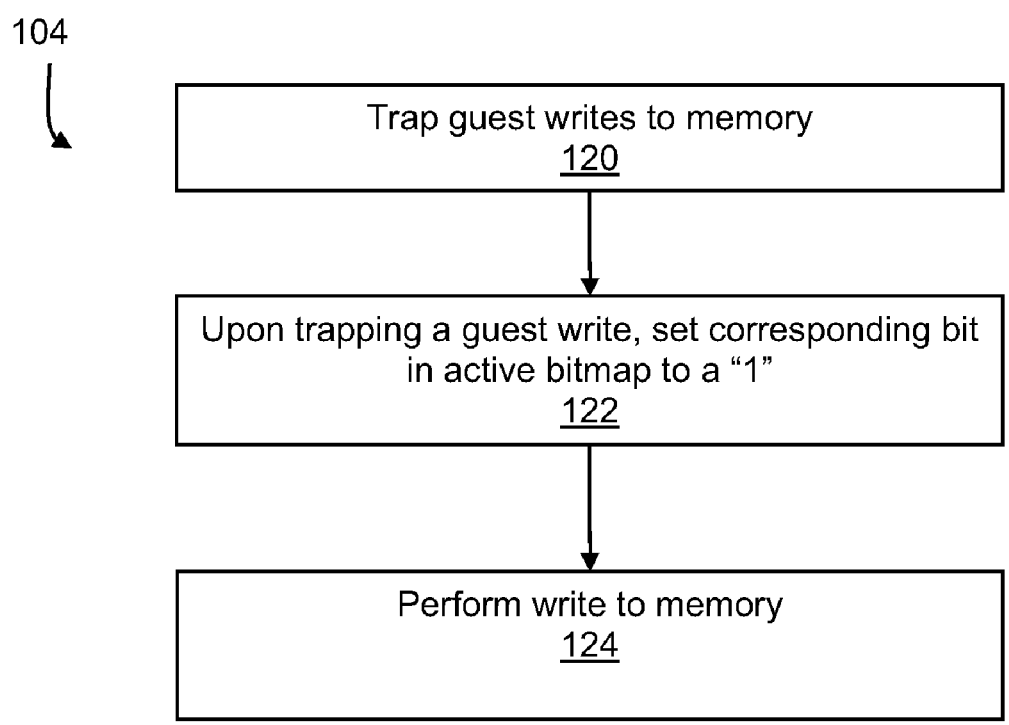
FIG. 5 shows a method performed by a guest virtual machine during the memory migration process in accordance with various embodiments.

FIG. 5 provides an embodiment of action 104 in which the guest VM 24 continues to read and write to memory 14. At 120, writes by the guest VM to memory 14 are trapped by hypervisor 20. At 122, upon trapping a write to memory, the hypervisor 20 sets to "1" the bit in the active bitmap 39 corresponding to the unit of memory being written. Setting that bit provides an indication that such unit of memory has been updated while the partial memory migration is underway. At 124, the write to the unit of memory is performed.

Figure 6:
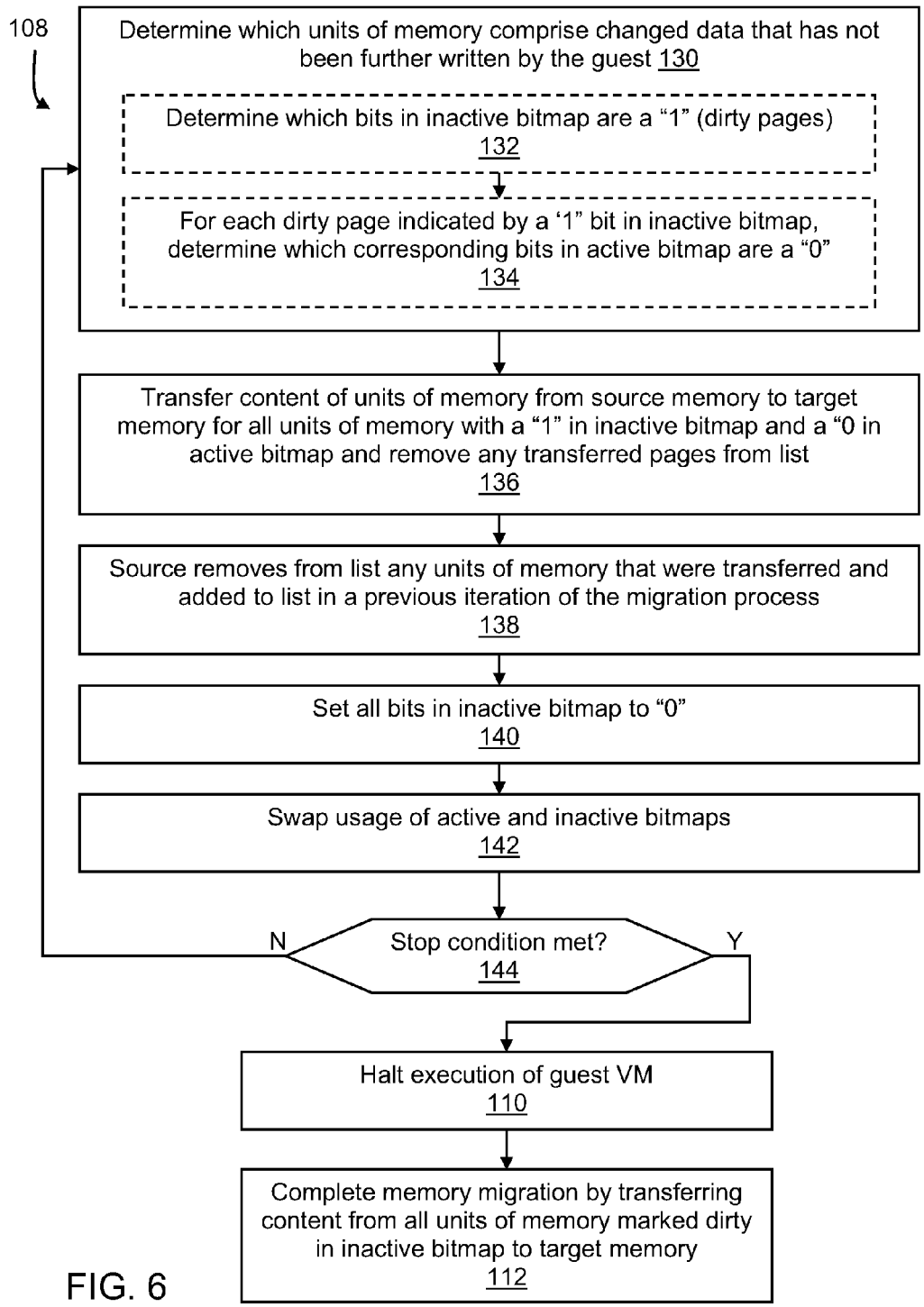
FIG. 6 shows a partial memory migration method in accordance with various embodiments.

FIG. 6 provides an embodiment of the partial memory migration 108 of FIG. 2 as well as actions 110 and 112. At 130, the method comprises determining which units of memory comprise changed data that has not been further written by the guest VM 24. In one embodiment of 130, the method comprises determining (132) which bits in the inactive bitmap 41 have a logic 1 state thereby indicating that the corresponding units of data are "dirty" (i.e., have updated valid data that needs to be migrated to the target memory 34). During the initial iteration through the partial memory migration process, all bits in the inactive bitmap 41 are set to 1 to force the memory migration process to initially attempt to migrate all units of memory associated with the guest VM 24.

At 134, for each unit of memory indicated to be dirty by the inactive bitmap, the method comprises determining which corresponding bits in the active bitmap 39 are a 0. The determination of 134 determines which units of memory 14 are indicated as being dirty by both the inactive and active bitmaps 39, 41. As will become clear below, a unit of memory indicated as being dirty in both bitmaps is a unit of memory that has been written multiple times in quick succession (e.g., during a given iteration of the partial memory migration process 108). In accordance with various embodiments, such units of memory determined to have been written multiple times in quick succession are omitted from a given iteration of the partial memory migration process. Because the unit of memory has been written multiple times in quick succession, it is possible that that unit of memory will again soon be written. That being a possibility, then the memory migration process of at least some embodiments avoids migrating that unit of memory. Once writing to that unit of memory ceases, then the iterative partial memory migration process will migrate that unit of memory.

Thus, at 136, the method comprises transferring to the target memory 34 the contents of all units of memory that are marked with a 1 (dirty) in the inactive bitmap 41 and with a 0 in the active bitmap 39. Any unit of memory that is marked as 1 in both bitmaps is not transferred.

At 138, the hypervisor 20 removes from a list (to be discussed below) any units of memory that have now been transferred (via 136) but were added to the list in a previous iteration of the migration process. During the first iteration of the migration process, no units of memory will be on the list.

At 140, the method comprises setting all bits in the inactive bitmap 41 to 0. At 142, the method comprises swapping usage of the inactive and active bitmaps. Thus, the active bitmap 39 is now what used to be the inactive bitmap 41, which has been set to all 0's. The inactive bitmap is now what used to be the active bitmap, which contains a 1 for each bit corresponding to a unit of memory that the guest VM 24 wrote during the current iteration of the partial memory migration process 108. This inactive bitmap is used in the next iteration of the migration process to determine which additional units of memory to transfer.

At 144, the method determines whether a stop condition has been met. Any of a variety of stop conditions can be used. For instance, the stop condition may comprise a predetermined number of iterations of actions 130-142 (the partial memory migration process 108). Alternatively, the stop condition may be when a number of units of memory to be transferred in each iteration does not reduce from one iteration to the next iteration (or does not reduce by more than a threshold amount). The stop condition could also be the number of units of memory to be transferred being less than a threshold or a time period to migrate memory in a given iteration being less than a threshold time period. It may be difficult or impossible ever to migrate all of the memory of the guest VM 24 as the guest VM continues to write the memory. One or more of the preceding stop conditions, or other stop conditions, can be applied to determine a suitable stopping point for the partial memory migration iterative process.

Referring still to FIG. 6, once the partial memory migration process (108 in FIG. 2) ceases, execution of the guest VM 24 is halted by the hypervisor 20 at 110. Up to that point, as much memory as is reasonably possible has been migrated while still permitting the guest VM to continue writing memory. Once the guest VM is halted, however, no more writes to memory will occur, and the memory migration process is completed at 112 by, for example, transferring to target memory the content from all units of memory marked as dirty in the inactive bitmap 41 resulting from the last iteration of the partial memory migration process.

Figure 7:
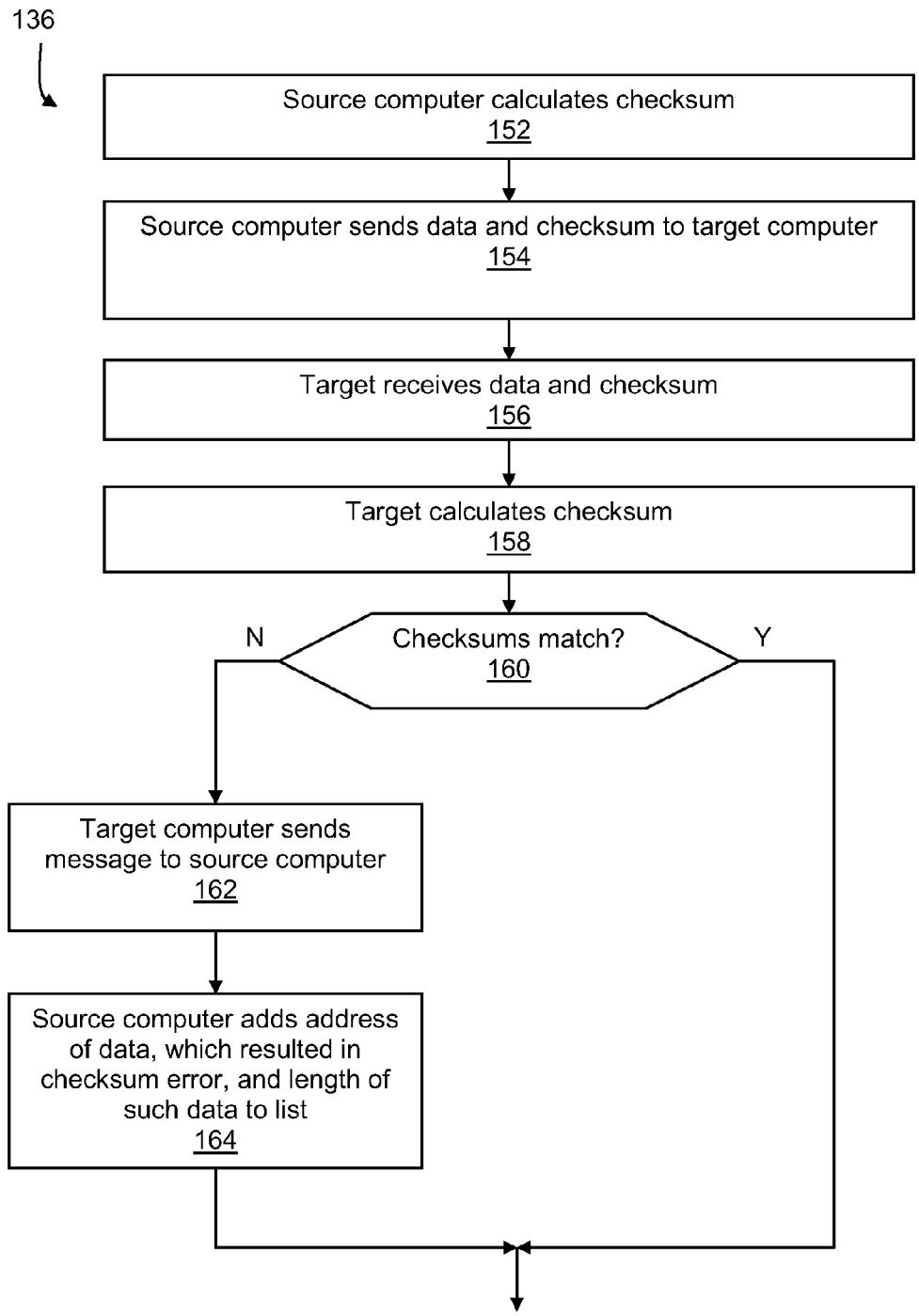
FIG. 7 shows a method including the detection of checksum errors in accordance with various embodiments.

FIG. 7 provides a method embodiment of action 136 from FIG. 6 in which units of memory marked with a 1 in the inactive bitmap and a 0 in the active bitmap are transferred to the target memory 34. At 152, the hypervisor calculates a checksum for each unit of memory to be transferred across the network communication link 25 to the target memory. In some embodiments, multiple contiguous units of memory are transferred and a checksum is calculated for the group of memory units. At 154, the source computer 10 sends the data being migrated along with the checksum to the target computer 30. At 156, the target computer 30 receives the data and the checksum, and at 158 calculates a checksum for the data received. As long as the data was successfully and accurately received, the two checksums should match. Mismatched checksums means that the data was not accurately received.

At 160, the checksums are compared. If the checksums match, then the migrated data was received correctly and nothing further need be done, other than continue with the process of FIG. 6 (138). If, however, the checksums do not match, then at 162, the target computer 30 sends a message back to the source computer 10. The message contains the address(es) of the unit(s) of data that were not received correctly by the target computer. These messages are sent asynchronously meaning that the source computer 10 may continue its memory migration process before receiving and processing the message from the target. In particular, the source computer need not immediately resend any improperly received units of data. Eventually, the source computer 10 receives the message from the target computer 30 and adds the address(es) from the message to the previously mentioned list. The list thus indicates which units of memory eventually need to be resent. In some embodiments, the message sent by the target computer may contain a value that indicates the length of the data (e.g., number of bytes) that needs to be resent and the length value is also added to the list along with the address(es).

Figure 8:
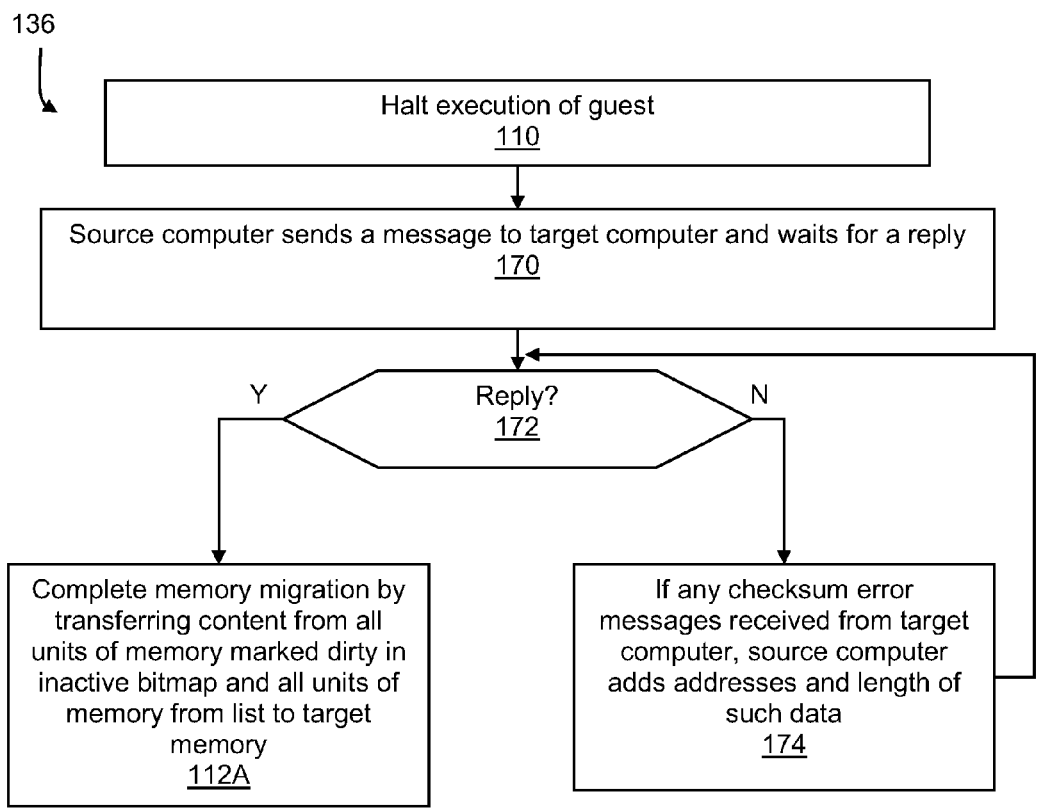
FIG. 8 shows additional detail regarding the completion of the memory migration process in accordance with various embodiments.

FIG. 8 provides detail that follows cessation of the partial memory migration process 108. At 110, the guest VM is halted. At 170, the source computer 10 sends a message to the target computer 30 and waits for a reply. The message being sent is not important and may simply be a status message that the source computer 10 has completed the partial memory migration process. In accordance with various embodiments, all replies to messages are returned in the same order as the messages themselves. The source computer 10 waits for a reply at 172 to the message sent in 170. While the source computer 10 is waiting for this specific reply, the source computer may receive at 174 messages from the target computer 30 containing additional checksum error indications (addresses and data lengths) from previously transferred data.

Once the source computer 10 receives a reply from the message sent at 170, then the source computer knows that all checksum error messages have been received and addresses from all unsuccessfully received units of memory have been added to the list described above. Thus, at 112A, the remainder of the memory migration process is completed by the source computer's hypervisor 20 transferring to the target computer 30 the content from all units of memory marked as dirty on the inactive bitmap 41 and all units of memory from the list.

The actions illustrated in the flow charts of FIGS. 2, 3, and 5-8 can be performed in a different order from that shown.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A source system, comprising:
   memory; and
   a hardware processor executing code to cause at least some of said memory to be migrated over a network to a target system;
   wherein the processor causes said memory to be iteratively migrated by migrating some of said memory while a guest continues to write said memory, halting execution of said guest, and completing a remainder of the memory migration; and wherein for each iteration, the processor determines which units of memory are marked as dirty on an inactive bitmap and, for each unit of memory, if the unit of memory is marked as dirty on the inactive bitmap, then the processor migrates that unit of memory if a corresponding bit on an active bitmap does not indicate the unit of memory is dirty and does not migrate the unit of memory if the corresponding bit on the active bit map indicates the unit of memory to be dirty.

2. The source system of claim 1 wherein said guest updates bits in the active bitmap upon performing a write to said memory while said processor reads bits from the inactive bitmap to determine which units of said memory comprise dirty data to be migrated.

3. The source system of claim 2 wherein said processor initializes all bits in the inactive bitmap to a first logic state and initializes all bits in the active bitmap to a second logic state different from the first logic state.

4. The source system of claim 2 wherein said processor causes said memory to be migrated iteratively, with each iteration comprising swapping usage of the active and inactive bitmaps.

5. The source system of claim 4 wherein during each iteration, said processor sets all bits in the active bitmap to a common logic state.

6. The source system of claim 4 wherein said processor continues to migrate said memory iteratively until detecting a stop condition, at which time the processor causes said guest to halt execution and complete the remainder of the memory migration.

7. The source system of claim 6 wherein the stop condition comprises a condition selected from a group consisting of a predetermined number of iterations, a number of units of memory to be transferred in each iteration not reducing from one iteration to the next iteration, the number of units of memory to be transferred being less than a threshold, and a time period to migrate memory in a given iteration being less than a threshold time period.

8. The source system of claim 1 wherein said processor determines which units of said memory comprise dirty data, transfers such units of said memory so determined to comprise dirty data to the target system along with a checksum, and receives a message from the target system indicating which, if any, units of such memory were received by the target system with a checksum error.

9. The source system of claim 8 further comprising a list containing identities of units of memory that were previously attempted to be transferred to said target memory but resulted in a checksum error, and wherein said processor removes an identity of a unit of memory from said list upon attempting to again transfer such a unit of memory.

10. A non-transitory computer-readable storage medium comprising software that, when executed by at least one processor causes the at least one processor to:

iteratively migrate memory while said memory continues to be written by a guest, wherein for each iteration, the software causes the processor to determine which units of memory are marked as dirty on a first bitmap and, for each unit of memory, if the unit of memory is marked as dirty on the first bitmap, then to migrate that unit of memory if a corresponding bit on a second bitmap does not indicate the unit of data to be dirty and not to migrate the unit of memory if the corresponding bit on the second bitmap indicates the unit of data to be dirty;

detect a stop condition for said iterative memory migration; and as a result of detecting said stop condition, cause said guest to halt writing to said memory and transfer all remaining units of memory marked as dirty on the first bitmap.

11. The non-transitory computer-readable storage medium of claim 10 wherein the software causes the at least one processor to initialize the first and second bitmaps, all of the bits in the first bitmap being initialized to a first common logic state and all bits in the second bitmap being initialized to a second common logic state different than the first common logic state.

12. The non-transitory computer-readable storage medium of claim 10 wherein, during each iteration of the iterative migration, the software causes the at least one processor to set all bits in the first bitmap to a common logic state and to swap usage of the first and second bitmaps.

13. The non-transitory computer-readable storage medium of claim 10 wherein the stop condition comprises a condition selected from a group consisting of a predetermined number of iterations, a number of units of memory to be transferred in each iteration not reducing from one iteration to the next iteration, the number of units of memory to be transferred being less than a threshold, and a time period to migrate memory in a given iteration being less than a threshold time period.

14. A method of memory migration, comprising:
writing, by a guest, to source memory of a virtual machine;
determining which units of source memory are marked as dirty on an inactive bit map;
for each unit of source memory, if the unit of source memory is marked as dirty on the inactive bitmap, then migrating that unit of source memory if a corresponding bit on an active bitmap does not indicate the unit of source memory to be dirty, and not migrating the unit of source memory if the corresponding bit on the active bitmap indicates the unit of source memory to be dirty;
halting execution of the guest thereby causing the guest to cease accessing the source memory; and
completing a remainder of the memory migration.

15. The method of claim 14 further comprising iteratively performing said determining and migrating and each iteration comprises swapping usage of the active and inactive bitmaps.

16. The method of claim 14 further comprising trapping writes by the guest to the source memory and changing a state of a bit in the active bitmap corresponding to a unit of the source memory written by the guest.

17. The method of claim 14 wherein completing the remainder of the source memory migration comprises transferring remaining units of memory marked as dirty.

* * * * *